United States Patent [19]
Danjou et al.

[11] Patent Number: 5,442,977
[45] Date of Patent: Aug. 22, 1995

[54] DIFFERENTIAL AXLE HOUSING

[75] Inventors: Seiji Danjou; Katsuya Miyata; Shuji Ohta, all of Kariya, Japan

[73] Assignee: Kabushiki Kaisha Toyoda Jidoshokki Seisakusho, Kariya, Japan

[21] Appl. No.: 68,984

[22] Filed: May 28, 1993

[30] Foreign Application Priority Data

Jun. 1, 1992 [JP] Japan .................. 4-166879

[51] Int. Cl.$^6$ .................. F16H 57/02; B21D 11/00
[52] U.S. Cl. .................. 74/607; 29/897.2
[58] Field of Search .................. 74/606 R, 607; 29/897.2, DIG. 32; 187/222, 237, 238

[56] References Cited

U.S. PATENT DOCUMENTS

| | | | |
|---|---|---|---|
| 1,043,785 | 11/1912 | Miller | 74/607 |
| 1,291,009 | 1/1919 | Johnson | 74/607 |
| 1,342,687 | 6/1920 | Melanowski | 74/607 X |
| 1,670,096 | 5/1928 | Booth | 74/607 |
| 1,934,854 | 11/1933 | Holmes | 74/607 |
| 1,973,905 | 9/1934 | Leach | 74/607 |
| 2,570,191 | 10/1951 | Beckwith | |
| 3,793,703 | 2/1974 | Winkler et al. | 74/607 X |

FOREIGN PATENT DOCUMENTS

| | | |
|---|---|---|
| 2372666 | 6/1978 | France . |
| 1264974 | 3/1968 | Germany . |
| 407465 | 3/1934 | United Kingdom . |
| 2155867 | 10/1985 | United Kingdom .................. 74/607 |

Primary Examiner—Rodney H. Bonck
Attorney, Agent, or Firm—Brooks Haidt Haffner & Delahunty

[57] ABSTRACT

The present invention discloses a differential axle housing which is particularly adapted for use in a fork lift and by which productivity is improved and which can be produced in a manner minimizing the wast of materials. Its differential housing has a generally cylindrical roll-forged ring portion having open ends along an axis, and a cover closing one of the open ends. A pair of straight cylindrical flange portions, preferably roll-forged, are attached in diametrically opposite relation to each other on the peripheral wall of the ring portion, each surrounding an axle opening therein. These elements are welded to the ring portion after being individually formed. Thus, the differential housing is produced. A pair of axle tubes are then shrink-fit and welded to the respective flange portions, and fitting brackets for receiving the mast pivot brackets of a fork lift mast are attached to the respective of the axle tubes.

10 Claims, 4 Drawing Sheets

DIFFERENTIAL AXLE HOUSING

BACKGROUND OF THE INVENTION

1. Field of the Invention

The present invention relates to a differential front axle housing used for industrial vehicles such as a fork lift or the like, and to a method of producing the same.

2. Description of the Prior Art

As is well known, a front axle housing used for a fork lift requires greater strength than these used for ordinary vehicles. This is because a support point for supporting a mast device tiltably in direction along the front and rear dimensions of the vehicle is on the axle housing. Also, in general, the front axle housing mainly comprises a differential housing and an axle tube, which are usually produced individually and then welded to each other for connection.

In view of such circumstances, conventionally, a typical differential housing for a front axle of a fork lift is formed of cast steel which is capable of withstanding a heavy load, and of being welded for connection.

FIGS. 5 and 6 show one example of conventional steel-cast differential housings used for fork lifts. A differential housing 11 has the following schematic construction, being formed in a generally cylindrical shape and laying an axis extending in direction from the front end to the rear end (from top to bottom in the plane of FIG. 5) of a vehicle (not shown). It also includes an opening 12 for connecting a differential carrier at one end along the axis, and flange portions 13 connected to an axle tube (not shown) and positioned diametrically opposite to each other on the right and left sides of the outer circumference of the differential housing 11. Furthermore, a fixing bracket and a mast pivot bracket are also fixed to the outer circumference of the axle tube for attaching the front axle housing to the body frame, though not shown in the drawings.

However, casting faults, for example, "a gas nest", might be produced in the steel-cast differential housing described above, and it is essential that such a gas nest be repaired, which further involves a thermal treatment for the repaired portion. Since the gas nest is often found during machining of metals, it has to be repaired after machining. This is extremely troublesome. Also, the cast-steel differential housing is known to produce residual stress, and a thermal treatment is required in order to eliminate it.

As stated above, the cast-steel differential housing requires not only ordinary production processes but also additional processes for readjustment purposes, thus causing extremely poor productivity.

Further, the differential housing 11 is provided with a seating face 15 in the form of a working reference surface for finishing the inner diameter of the flange portions 13 and a seat face for connection to a gear housing, and for machining tap holes 14 or the like. As is clearly seen from the dotted line in FIG. 5, a considerable amount of material has to be removed from the original seat face in order to form the targeted seat face 15, thus wasting materials. Also, the steel-cast products require a large volume of liquid metal for indirectly related production purposes, such as for the hot top and runner, the use of which is also a waste of materials.

SUMMARY OF THE INVENTION

Accordingly, a main object of the present invention is to provide a differential axle housing, which is effective for improving productivity and which can be produced in a manner without a waste of materials, and to provide a method of producing the same.

To achieve the above object, the present invention provides a differential axle housing which includes a differential housing comprising: a generally cylindrical ring portion having an axis, opened ends on respective ends opposite of the ring portion along the axis, and a pair of openings diametrically opposite to each other through the peripheral wall of the ring portion; and a cover for closing one of the opened ends of the ring portion. A pair of flange portions are welded on the respective openings of the ring portion, and a pair of axle tubes are shrink-fit and welded on to the respective flange portions. A fitting bracket is mounted on each axle tube to adapt the housing for attachment to a fork lift, and for mounting of the lift mast thereon. The ring portion, the cover, the pair of flange portions, the axle tubes and the fitting brackets are formed individually, and then integrally connected.

Both the ring portion and the flange portions for connecting respective axle tubes and which form the main portions of the differential housing are generally cylindrical, and thus they can be formed by roll-forging, thereby overcoming the drawbacks of steel-cast differential housings which have poor productivity. Also, the strengths of the ring portions and the flange portions formed by roll-forging can be enhanced, thus enabling the differential housing to be lighter in weight. Since the waste of materials during processing of raw materials into the finished product is extremely small, the yield of such differential housings is remarkably improved in comparison to that of steel-cast differential housings. On the other hand, the cover can be formed by press-working an iron plate. Thus, after the respective components are formed individually, they are connected by welding or via bolts, thereby completing a predetermined differential housing.

According to the present invention, a method of producing such a differential housing is also disclosed. The differential housing is produced by the steps of forming a generally cylindrical ring portion by roll-forging, the ring portion having an axis and respectively opposite opened ends along the axis of the ring portion; press-molding a plate member so as to produce a cover having a sufficient size to close one of the opened ends of the ring portion; forming a pair of flange portions; forming a pair of axle openings for the pair of flange portions in the peripheral wall of the formed ring portion so as to be diametrically opposite to each other; mounting the cover on one of the opened ends; and securing the pair of flange portions to the ring portion at the respective of the pair of openings.

BRIEF DESCRIPTION OF THE DRAWINGS

The invention will become more readily apparent from the following description of preferred embodiments thereof shown, by way of example only, in the accompanying drawings in which.

DESCRIPTION OF THE PREFERRED EMBODIMENTS

Figure 1:
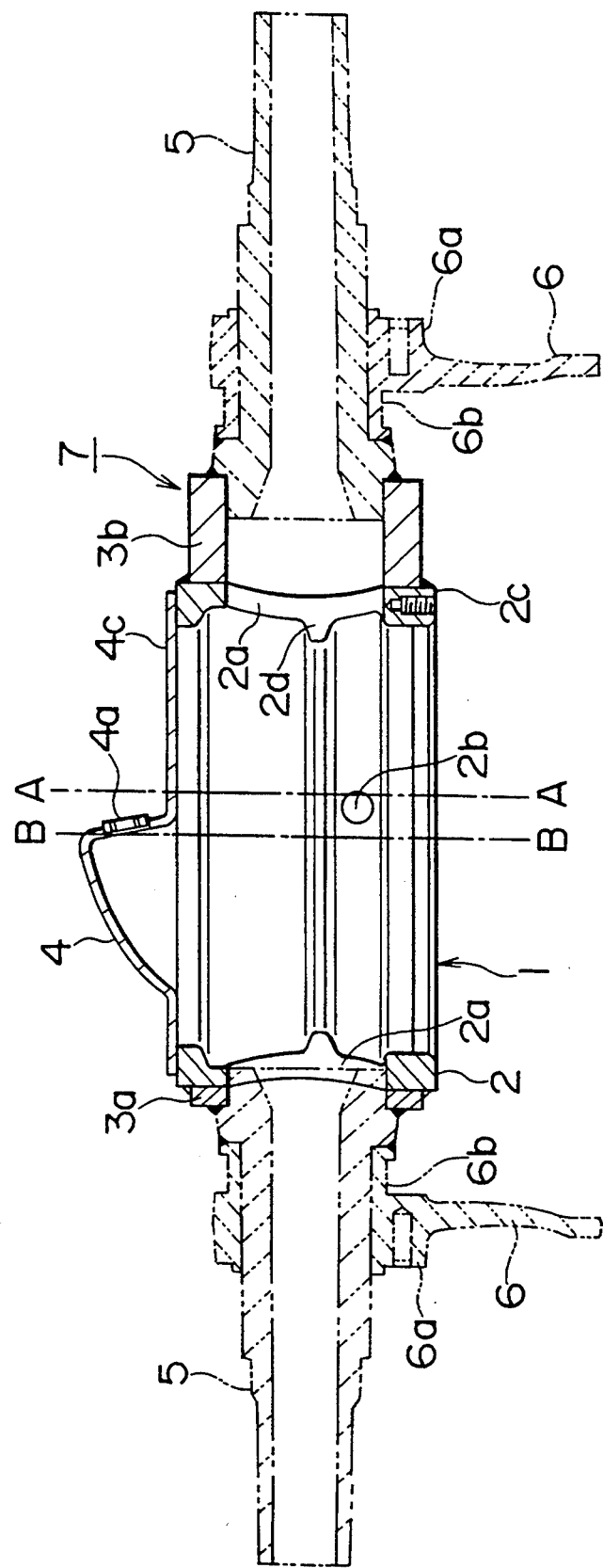
FIG. 1 is a sectional top plan view of a front axle housing in a preferred embodiment according to the present invention.
Figure 2:
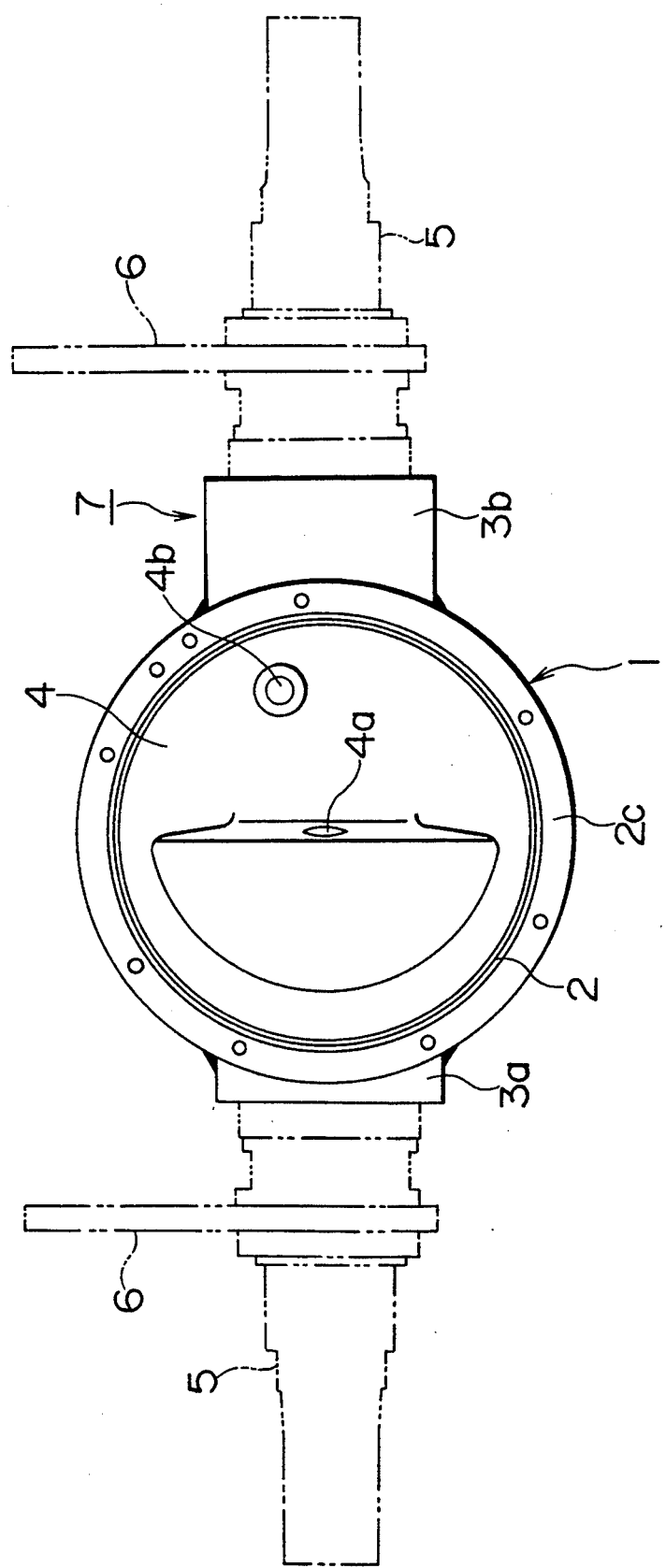
FIG. 2 is a front plan view of the embodiment shown in FIG. 1.
Figure 3:
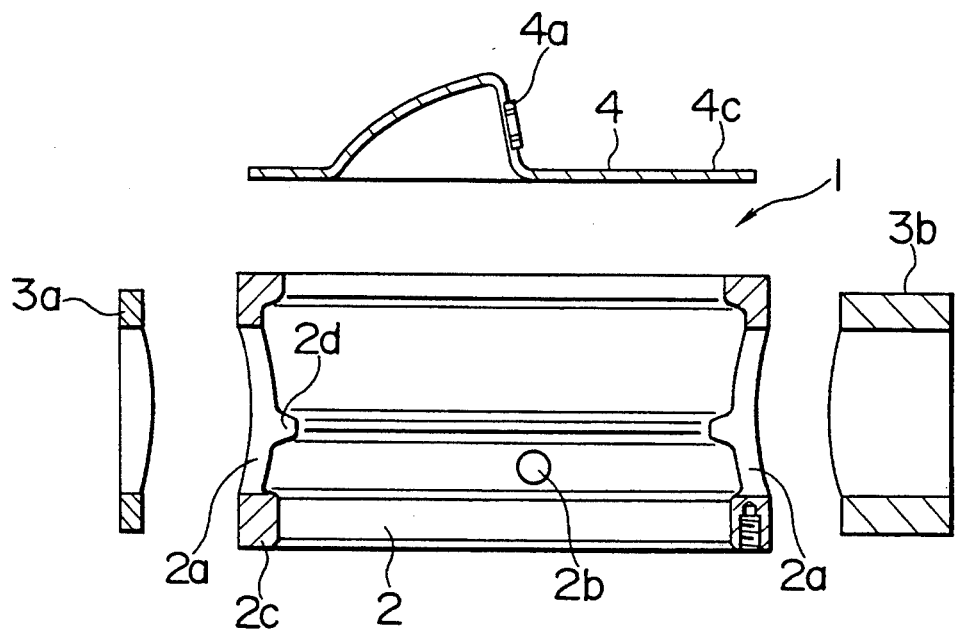
FIG. 3 is an exploded view showing each component forming the differential housing of the present invention before assembly.

Referring to the drawings, in particular, to FIGS. 1 and 2, a front axle housing of a fork lift achieved by a preferred embodiment of the present invention is schematically shown by reference numeral 7. The front axle housing 7 comprises a differential housing 1 indicated by solid line and axle tubes 5 indicated by dotted line. The differential housing 1 is formed of a plurality of components according to the present invention as best shown in FIG. 3, that is, a ring portion 2, flange portions 3a and 3b each positioned respectively on the right and left sides of the differential housing 1, and a cover 4.

The ring portion 2 is a generally cylindrical body of the differential housing capable of accommodating therein a differential gear mechanism (not shown), which body includes opposite open ends along the axis extending in the front and rear directions of a vehicle body (not shown). An annular projection 2d is formed on the inner circumference of the ring portion 2, and a pair of circular through openings 2a are coaxially formed diametrically opposite to each other through the peripheral wall of the ring 2. A drain port 2b is provided below the projection 2d through the peripheral wall of the ring portion 2. Since the ring portion 2 has the above-mentioned configuration, it can be formed by roll-forging. The openings 2a and the drain port 2b are formed by machining after they are initially shaped by roll-forging.

The flanges 3a and 3b positioned on the right and left sides of the differential housing 1 are each formed in a cylindrical or ring shape, and thus they can also be shaped by roll-forging. After so shaped by roll-forging, they are welded to the outer peripheral wall of the ring portion 2 while abutting against the outer peripheral wall so as to be coaxially coupled to the respective openings 2a of the ring portion 2, as illustrated in FIG. 1.

In a fork lift, the center line B—B of the differential housing 1 is usually displaced relative to the center line A—A of the vehicle, as shown in FIG. 1. Accordingly, the length of the flange 3a is deliberately made smaller than that of the flange 3b for accommodation purposes in order that the distances from the center line A—A of the vehicle to the ends of the flanges 3a and 3b, respectively are the same.

The cover 4 is formed of a plate member in such a shape as to be capable of closing the circular open end at the rear of the ring portion 2. An oil inlet 4a is formed on the side of a swollen portion of a lopsided cone shape on substantially the left half of the cover 4 in the drawings, and a hole 4b for visually confirming the oil level in the differential housing is provided in the flat portion on the right half of the cover 4. The cover 4 is made of a metal plate, such as a steel plate, which is formed in a predetermined shape by pressing, and then the periphery of the cover 4 is welded to the ring portion 2 while it abuts against the rear end surface of the ring portion 2.

The axle tubes 5 indicated by dotted line in FIGS. 1 and 2, which are the remaining components forming the front axle housing 7, are shrink-fit into the flange portions 3a and 3b positioned on the right and left ends of the differential housing 1 in the form of the finished product, and then welded to the flanges 3a and 3b. Thus, the front axle housing 7 is assembled. Boss portions 6a of fitting brackets 6 for fitting the front axle housing 7 to a body frame are fitted onto the outer peripheries of the axle tubes 5 and welded to the axle tubes 5 so that they are firmly connected. The boss portions 6a have fitting surfaces, 6b for pivotably fitting mast pivot brackets (not shown) on the outer peripheries of the boss portions 6a.

In summary, the differential housing 1 of this embodiment stated above is constructed as follows. It is divided into four components in which the main portions, that is, the ring portion 2 and the flange portions 3a and 3b for connecting the axle tubes, are each formed in a generally cylindrical shape so that they can be formed by roll-forging. Thus, the roll-forged differential housing 1 has more stabilized quality after it is shaped than a conventional steel-cast differential housing, and therefore, it is totally free from readjusting processes for repairing a gas nest as might be detected in a steel-cast product and accompanying processes such as a thermal treatment for eliminating residual stress or the like. As a result, extremely high productivity can be expected, although a welding process is added for connecting those four components after they are formed individually.

In addition, the materials of the roll-forged products are improved in their characteristics during forging, thus enhancing precision and toughness of the structure, and giving the roll-forged products greater strength than the steel-cast products. This enables the wall thickness of the ring portion 2 and the flange portions 3a and 3b to be even thinner, and accordingly the differential housing to be even lighter.

In this embodiment, the cover 4 of the differential housing 1 is made of an iron plate and includes a flat surface 4c, thereby easily obtaining a working reference surface when the openings 2a are formed, and when a seating face 2c for connecting the differential carrier or forming the tap holes of the flanges 3a and 3b or the like, after the differential housing 1 is assembled. Therefore, it is no longer necessary to remove or shave off a large amount of material for obtaining a working reference surface, which might have been carried out in a conventional differential housing, thus reducing a waste of materials.

Figure 4:
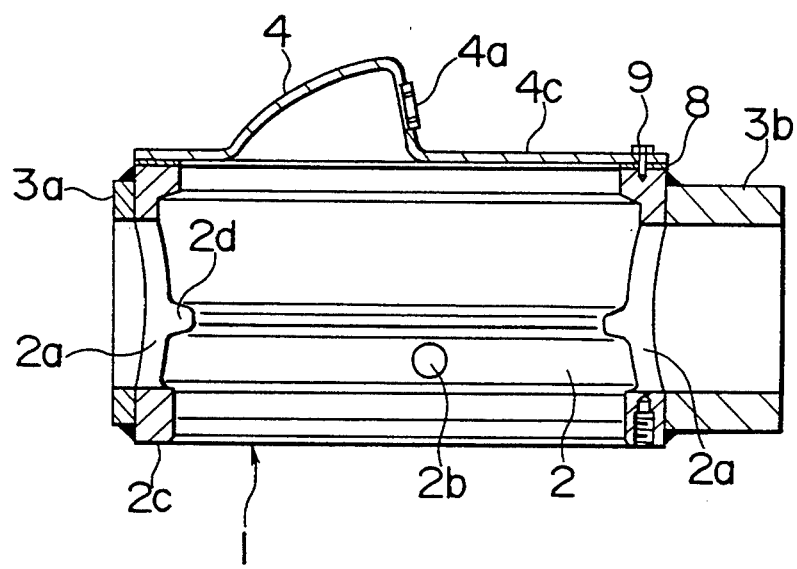
FIG 4 is a sectional top plan view of a differential housing in another embodiment according to the present invention.
Figure 5:
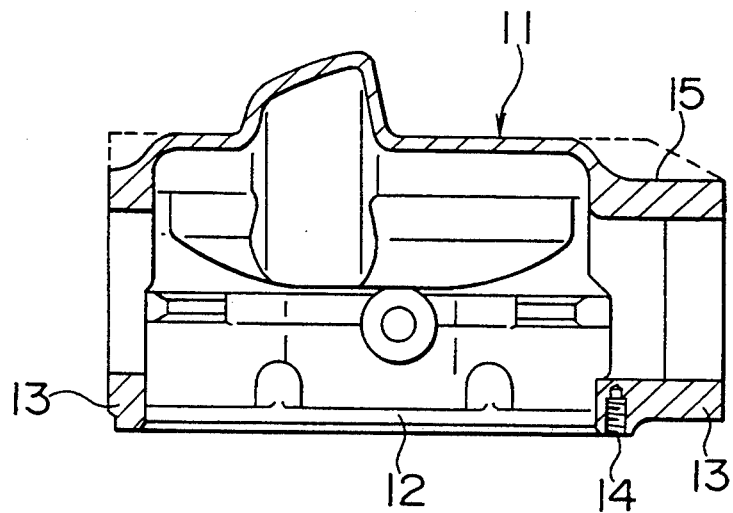
FIGS. 5 and 6 show a conventional differential housing made of cast steel, in sectional top plan view and in front plan view, respectively.
Figure 6:
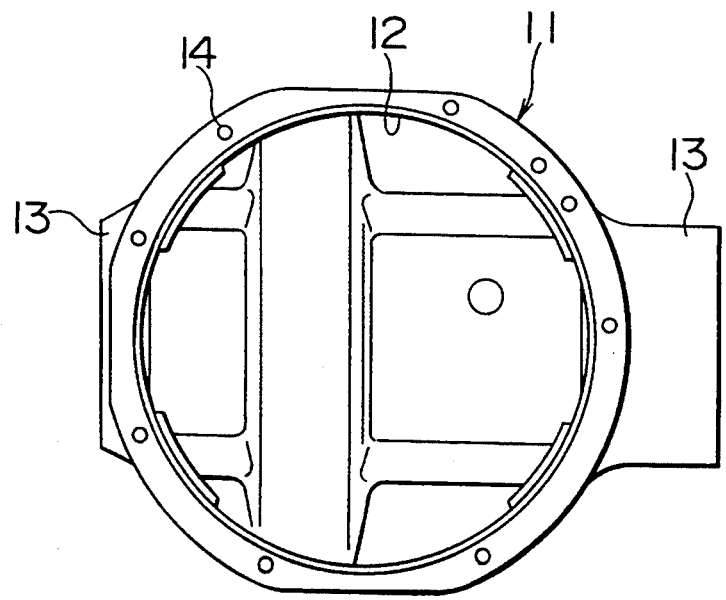

In another embodiment shown in FIG. 4, a gasket 8 made of a suitable gasket material intervenes within the interface between the cover 4 and the ring portion 2, and the cover 4 is not welded, but mounted firmly on the ring portion 2 via a plurality of bolts 9. The other constructions of this embodiment are similar to those of the previous embodiment. According to this embodiment illustrated in FIG. 4, the cover 4 is detachable from the ring portion 2 so that maintenance work on the differential gear mechanism can be carried out easily when the necessity arises.

While the present invention has been described with reference to what are presently considered to be the preferred embodiments, it is to be understood that the invention is not limited to the disclosed embodiments. To the contrary, the invention is intended to cover various modifications. For example, the projections 2d arranged on the inner circumference of the ring portion 2 are not essential, and the ring portion 2 may be any shape as long as the ring 2 can be roll-forged. Also, the flange portions 3a and 3b may be produced by another method other than roll-forging.

What is claimed is:

1. A differential axle housing for a fork lift vehicle having a mast device including a pair of mast pivot brackets for connection to said differential axle housing, said differential axle housing comprising:

a generally cylindrical ring portion of roll-forged steel providing a differential housing having opposite open ends, and means providing a pair of diametrically opposite axle openings through said ring portion, a pair of straight cylindrical flange portions each welded to, and projecting radially outward from said ring portion in surrounding relation with a respective one of said axle openings, each said cylindrical flange portion having internal diameter substantially equal to the diameter of said one axle opening with which it is in surrounding relation, a pair of axle tubes each aligned with and welded to a respective one of said cylindrical flange portions to project outwardly therefrom, and a pair of fitting brackets each secured to a respective one of said axle tubes and projecting radially outward therefrom, each said fitting bracket having a boss for mounting said differential axle housing on said vehicle and a fitting surface for mounting one of said pair of mast pivot brackets thereon.

2. A differential axle housing according to claim 1, which further comprises a pressed steel cover plate secured to said ring portion and closing one of said open ends of said differential housing and having a surface providing a working reference surface thereon.

3. A differential axle housing according to claim 2, wherein said cover plate has an annular periphery which is welded to said ring portion.

4. A differential axle housing according to claim 2, wherein said cover plate has an annular periphery, and which further comprises a gasket disposed between said cover plate periphery and said ring portion, and a plurality of annularly spaced apart bolts detachably securing said cover plate periphery and said ring portion together with said gasket therebetween.

5. A method of producing a differential axle housing for a fork lift vehicle having a pivotable mast device including a pair of mast pivot brackets, said method comprising the steps of:

roll-forging a generally cylindrical steel ring portion to provide a differential housing having opposite open ends, and forming a pair of diametrically opposite axle openings through said ring portion;

forming a pair of straight cylindrical steel flange portions and welding each said flange portion to said ring portion to project outwardly therefrom in surrounding relation with a respective one of said axle openings, each said flange portion having internal diameter substantially equal to the diameter of said one of said openings with which it is in surrounding relation;

attaching a pair of axle tubes each to a respective one of said flange portions, each said axle tube being aligned with and projecting outwardly from the said flange portion to which it is attached;

providing a pair of fitting brackets each having a boss and a fitting surface thereon; and attaching said pair of fitting brackets each to, and projecting radially outward from, a respective one of said axle tubes for mounting said differential axle housing on said vehicle using said boss and for mounting one of said mast pivot brackets on said fitting surface thereof.

6. A method of producing a differential axle housing according to claim 5, wherein each of said pair of steel flange portions is formed by roll forging.

7. A method of producing a differential axle housing according to claim 5, wherein each of said pair of axle openings is at least initially formed by roll forging the opening contemporaneously with said roll forging of said ring portion.

8. A method of producing a differential axle housing according to claim 5, which further comprises providing an annular attachment end on each of said axle tubes prior to said attaching thereof to one of said cylindrical flange portions, said annular attachment end having exterior diameter for shrink-fitting engagement within said cylindrical flange portion to which said axle tube is attached, and said attaching of said pair of axle tubes comprises shrink-fitting together each said flange portion and said attachment end of its said axle tube.

9. A method of producing a differential axle housing according to claim 5, which further comprises press-molding a steel cover plate, providing a working reference surface on said cover plate, and securing said cover plate to said ring portion to close one of said open ends thereof.

10. A method according to claim 9, wherein said cover plate is detachably secured to said ring portion.

* * * * *